United States Patent
Tangen

(10) Patent No.: US 7,628,495 B2
(45) Date of Patent: Dec. 8, 2009

(54) MIRROR-BASED LIGHT PATH COMBINATION FOR LIGHT SOURCES

(75) Inventor: Kyrre Tangen, Kringsja (NO)

(73) Assignee: Infocus Corporation, Wilsonville, OR (US)

(*) Notice: Subject to any disclaimer, the term of this patent is extended or adjusted under 35 U.S.C. 154(b) by 535 days.

(21) Appl. No.: 11/422,527

(22) Filed: Jun. 6, 2006

(65) Prior Publication Data

US 2006/0274187 A1 Dec. 7, 2006

Related U.S. Application Data

(60) Provisional application No. 60/688,313, filed on Jun. 6, 2005.

(51) Int. Cl.
G03B 21/26 (2006.01)
G03B 21/00 (2006.01)
H04N 9/12 (2006.01)
(52) U.S. Cl. .................. 353/94; 353/31; 348/742
(58) Field of Classification Search ............ 353/20, 353/85, 94; 348/742, 743, 744; 349/5, 7, 349/8, 9; 362/230, 231, 232, 241, 800
See application file for complete search history.

(56) References Cited

U.S. PATENT DOCUMENTS

| 5,982,553 | A   |   | 11/1999 | Bloom et al.   |         |
|-----------|-----|---|---------|----------------|---------|
| 6,449,036 | B1  |   | 9/2002  | Wollmann et al.|         |
| 6,869,189 | B2  |   | 3/2005  | Kim et al.     |         |
| 6,899,435 | B2  | * | 5/2005  | Yamanaka       | 353/94  |
| 7,159,987 | B2  | * | 1/2007  | Sakata         | 353/31  |
| 7,237,909 | B2  | * | 7/2007  | Yokote et al.  | 353/94  |
| 7,322,703 | B2  | * | 1/2008  | Matsui         | 353/84  |
| 7,347,557 | B2  | * | 3/2008  | De Smet        | 353/20  |
| 7,360,900 | B2  | * | 4/2008  | Sakata et al.  | 353/20  |
| 2003/0076057 | A1 | * | 4/2003 | Fleury         | 315/291 |
| 2005/0018717 | A1 |   | 1/2005 | Karakawa       |         |
| 2005/0083565 | A1 | * | 4/2005 | Yamazaki et al.| 359/244 |
| 2005/0213051 | A1 |   | 9/2005 | Smet           |         |

* cited by examiner

*Primary Examiner*—William C Dowling
*Assistant Examiner*—Ryan Howard
(74) *Attorney, Agent, or Firm*—Schwabe Williamson & Wyatt

(57) ABSTRACT

Embodiments of the present invention include a method, apparatus, and system for a mirror assembly sequentially optically coupling a plurality of light sources to downstream projection components. Other embodiments may be described and claimed.

17 Claims, 3 Drawing Sheets

MIRROR-BASED LIGHT PATH COMBINATION FOR LIGHT SOURCES

CROSS REFERENCE TO RELATED APPLICATION

The present application claims priority to U.S. Provisional Application No. 60/688,313, filed Jun. 6, 2005, entitled "Mirror-Based Light Path Combination For Light Emitting Devices," the entire contents of which is hereby incorporated by reference.

FIELD

Disclosed embodiments of the present invention relate to the field of projection systems, and more particularly to the use of a mirror to combine the light paths of multiple light emitting devices in such projection systems.

BACKGROUND

Multimedia projection systems have become popular for purposes such as conducting sales demonstrations, business meetings, classroom training, and for use in home theaters. In typical operation, multimedia projection systems receive video signals from a data source and convert the video signals to digital information to control one or more digitally driven light valves. Based on this digital information the light valves may manipulate incident light into image bearing light that represents the video image. High-energy discharge lamps emitting polychromatic light have often been used in prior art projection systems. These prior art projection systems suffer from a number of disadvantages including a short lamp life and reduced brightness after an initial period of usage. Additionally, there is a significant amount of resources directed to dividing the polychromatic light in order to selectively manipulate light of the primary colors.

Recent focus has turned to developing and manufacturing projection systems employing and utilizing the monochromatic light of solid state light sources, which are less affected by the shortcomings of polychromatic light sources. One challenge of using multiple monochromatic light sources in projection systems is to combine the light from the light sources, while being cognizant of the reliability, performance, package dimensions, and cost of the projection systems.

BRIEF DESCRIPTION OF THE DRAWINGS

Embodiments of the invention are illustrated by way of example and not by way of limitation in the figures of the accompanying drawings, in which the like references indicate similar elements and in which.

DETAILED DESCRIPTION

In the following detailed description reference is made to the accompanying drawings that form a part hereof, wherein like numerals designate like parts throughout, and in which is shown, by way of illustration, specific embodiments in which the invention may be practiced. It is to be understood that other embodiments may be utilized and structural or logical changes may be made without departing from the scope of the embodiments of the present invention. Directions such as up, down, back, and front may be used in the discussion of the drawings. These directions are used to facilitate the discussion and are not intended to restrict the application of embodiments of this invention. Therefore, the following detailed description is not to be taken in a limiting sense.

For the purposes of the present invention, the phrase "A/B" means A or B; the phrase "A and/or B" means "(A), (B), or (A and B)"; the phrase "A, B, and/or C" means "(A), (B), (C), (A and B), (A and C), (B and C), or (A, B and C)"; and the phrase "(A)B" means "(B) or (AB)," that is, A is an optional element.

Embodiments of the present invention include an illumination arrangement capable of time-multiplexing light provided by a plurality of light sources, e.g., light-emitting devices (LEDs), by using a mirror assembly. The mirror assembly may have a mirror element with sequential positions to optically couple the plurality of LEDs to downstream components in sequence with their activation. For example, the mirror element may be positioned to optically couple a first LED to a downstream component while the first LED is activated, positioned to optically couple a second LED to the downstream component while the second LED is activated, and so on. Illumination arrangements in accordance with some embodiments of the present invention are described in further detail below.

Figure 1:
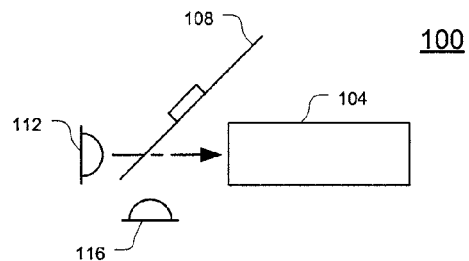
FIG. 1 illustrates an illumination arrangement with a mirror assembly optically coupling a first light source to projection components, in accordance with an embodiment of the present invention.

FIG. 1 illustrates an illumination arrangement 100 for use in a projection system in accordance with an embodiment of the present invention. The illumination arrangement 100 may optically couple a number of light sources to downstream projection components 104 by operation of a mirror assembly such as a mirror wheel 108. As used herein, optically coupling a light source to projection components 104 means that light emitted by the light source will be presented to the projection components. The projection components 104 may receive the light from the light sources and manipulate the light into a projected image.

Figure 2:
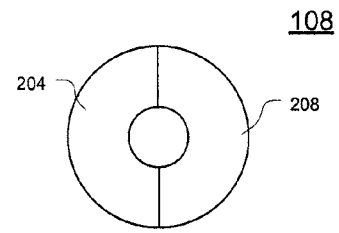
FIG. 2 illustrates the mirror assembly of the illumination arrangement depicted in FIG. 1, in accordance with an embodiment of the present invention.

FIG. 2 illustrates a front view of the mirror wheel 108 in accordance with an embodiment of the present invention. The mirror wheel 108 may include a transparent section 204 and a non-transparent section 208, each occupying about half of the surface area. Other embodiments may have these sections occupying other amounts of the surface area.

Referring again to FIG. 1, a first light source, e.g., LED 112, may be activated to provide light along a light path. The mirror assembly may optically couple the LED 112 to the projection components 104 by coordinating the mirror wheel 108 with the activation of the LED 112 so that the transparent section 204 allows the light to be transmitted. In this embodiment, a second light source, e.g., LED 116, may be deactivated. In another embodiment, the LED 116 may remain activated and the light provided by the LED 116 may be transmitted up through the transparent section 204 of the mirror wheel 108, e.g., optically decoupled from the projection components 104 by operation of the mirror wheel 108.

Figure 3:
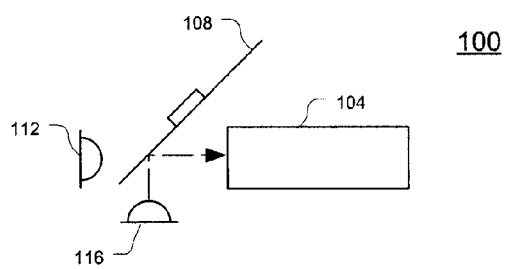
FIG. 3 illustrates the illumination arrangement depicted in FIG. 1 with the mirror assembly optically coupling a second light source to the projection components, in accordance with an embodiment of the present invention.

FIG. 3 illustrates an embodiment where the first LED 112 is deactivated and the second LED 116 is activated. In this embodiment, the mirror assembly 108 may operate to optically couple the LED 116 to the projection components 104 by rotating the mirror wheel 108 so that the non-transparent section 208 receives the light from the LED 116. The non-transparent section 208 may have a reflective surface on the side facing the LED 116 that may reflect light from the LED 116 to the projection components 104, either directly or indirectly. As used herein, "towards the projection components 104" shall mean the light is generally propagated in an optical downstream direction that will, directly or indirectly, reach the projection components 104.

By coordinating the activation of the LED 112, the activation of the LED 116, and the rotation of the mirror wheel 108, embodiments of the present invention may facilitate the presentation of light from a plurality of light sources to downstream projection components along a common light path, which may, in turn, facilitate the preservation of a projection system's etendue.

Illumination arrangements of various embodiments may have light sources including polychromatic and/or monochromatic LEDs such as, but not limited to, light emitting diodes, LASER (e.g., a LASER diode), etc. Illumination arrangements taught by embodiments of the present invention may allow for colored light paths to be effectively combined without the need for dichroic filters that may inadvertently filter out some of the light that is intended to pass.

The illumination arrangement 100 shown and described above involves two LEDs. Other embodiments may include other numbers of LEDs. Furthermore, the illumination arrangement 100 generally illustrates each light source including one LED. Other embodiments may include a light source with more than one LED.

Figure 4:
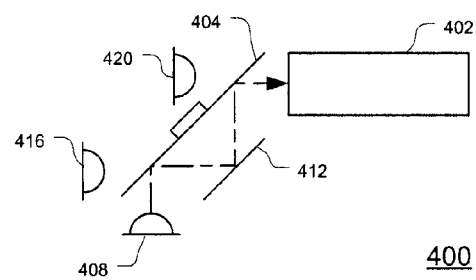
FIG. 4 illustrates an illumination arrangement with a mirror assembly optically coupling a first light source to projection components, in accordance with another embodiment of the present invention.
Figure 5:
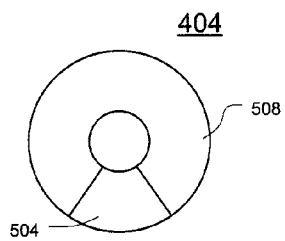
FIG. 5 illustrates the mirror assembly of the illumination arrangement depicted in FIG. 4 in accordance with an embodiment of the present invention.

FIG. 4 illustrates an illumination arrangement 400 having a mirror assembly with a mirror wheel 404 for optically coupling a number of LEDs to the projection components 402, in accordance with an embodiment of the present invention. FIG. 5 illustrates a front view of the mirror wheel 404 in accordance with an embodiment of the present invention. The mirror wheel 404 may have a transparent section 504 and a non-transparent section 508, occupying about ⅓ and ⅔ of the surface area, respectively. Other embodiments may have these sections occupying other amounts of the surface area.

Referring again to FIG. 4, the mirror assembly may operate to optically couple the LED 408 to the projection components 402 by positioning the non-transparent section 508 of the mirror wheel 404 to receive and reflect light from the LED 408. The light from the LED 408 may be reflected towards a mirror 412 where it may be reflected towards the projection components 402 via an intermediate reflection off of another portion of the non-transparent section 508.

While the mirror wheel 404 is in the position to optically couple the first LED 408 to the projection components 402, as shown above, a second LED 416 and a third LED 420 may be deactivated or otherwise optically decoupled.

Figure 6:
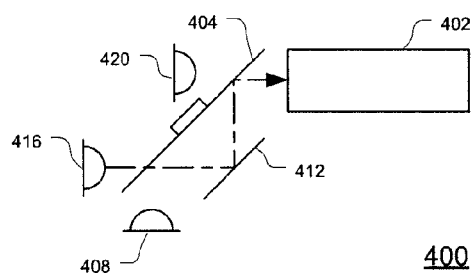
FIG. 6 illustrates the illumination arrangement depicted in FIG. 4 with the mirror assembly optically coupling a second light source to the projection components, in accordance with another embodiment of the present invention.

FIG. 6 illustrates the illumination arrangement 400 having the mirror wheel 404 in a position to optically couple the second LED 416 to the projection components 402. In this embodiment, the LED 416 may provide light at a time when the transparent section 504 of the mirror wheel 404 is in-line with the light path from the LED 416. The light may be transmitted through the transparent section 504, to the mirror 412 and reflected towards the projection components 402 via an intermediate reflection off of the non-transparent section 512.

While the mirror wheel 404 is in a position to optically couple the second LED 416 to the projection components 402, as shown in FIG. 6, the LED 408 and the LED 420 may be deactivated or otherwise optically decoupled.

Figure 7:
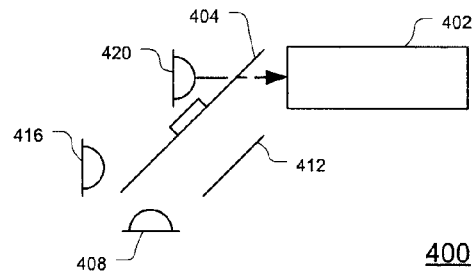
FIG. 7 illustrates the illumination arrangement depicted in FIG. 4 with the mirror assembly optically coupling a third light source to projection components, in accordance with another embodiment of the present invention.

FIG. 7 illustrates the illumination arrangement 400 having the mirror wheel 404 in a position to optically couple the third LED 420 to the projection components 402. In this embodiment, the LED 420 may provide light at a time when the transparent section 504 of the mirror wheel 404 is in-line with the light path from the LED 420. The light may be transmitted through the transparent section 504 to the projection components 402.

Although the above embodiments show mirror wheels having one transparent section and one non-transparent section, other embodiments may include other numbers. Additionally, various embodiments may include transparent and/or non-transparent sections of a variety of different shapes other than those shown and described in the above embodiments. Furthermore, while specific layouts and associated light propagation features of the mirror wheel, e.g., for transmission or reflection of light, are shown and discussed, other embodiments may include variations on these layouts and/or propagation features.

Figure 8:
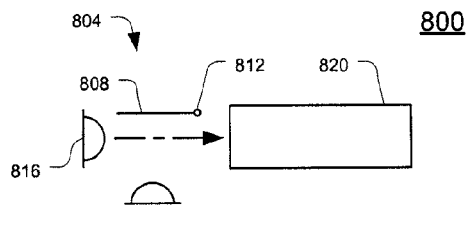
FIG. 8 illustrates an illumination arrangement with a mirror assembly optically coupling a first light source to the projection components, in accordance with another embodiment of the present invention.

FIG. 8 illustrates an illumination arrangement 800 in accordance with another embodiment of the present invention. In this embodiment, a mirror assembly 804, having a mirror element 808 and a hinge 812, may operate to optically couple a first LED 816 to projection components 820. In this embodiment, the mirror assembly 804 may optically couple the LED 816 with the projection components 820 by rotating the mirror element 808 to a first position that is out of the light path while of the LED 816, while the LED 816 is activated.

While the mirror assembly 804 is shown located outside of the light path of the LED 816, in other embodiments the mirror assembly 804 may be located in the light path and may optical couple the LED 816 by presenting a non-obstructive profile to the LED 816, e.g., by positioning the mirror element 808 parallel to the direction of the light path. This arrangement may allow placement of the hinge 812 along an axis of symmetry of the mirror element 808, discussed in further detail below.

Figure 9:
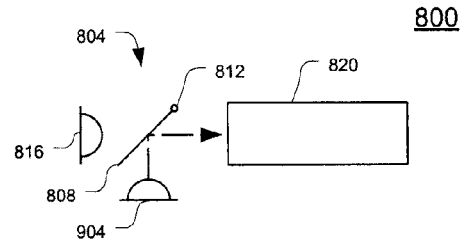
FIG. 9 illustrates the illumination arrangement depicted in FIG. 8 with a mirror assembly optically coupling a second light source to the projection components, in accordance with another embodiment of the present invention.

FIG. 9 illustrates the illumination arrangement 800 with the mirror assembly 804 optically coupling a second LED 904 to the projection components 820. The mirror assembly 804 may operate to optically couple the LED 904 to the projection components 820 by rotating the mirror element 808 so that it reflects light provided by the LED 904 to the projection components 820.

Figure 10:
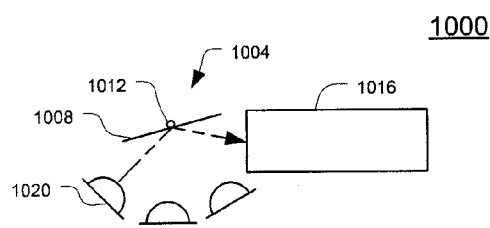
FIG. 10 illustrates an illumination arrangement with a mirror assembly optically coupling a first light source to the projection components, in accordance with another embodiment of the present invention.

FIG. 10 illustrates an illumination arrangement 1000 in accordance with another embodiment of the present invention. In this embodiment, a mirror assembly 1004, having a mirror element 1008 and a hinge 1012, may be capable of sequentially optically coupling three LEDs to projection components 1016. FIG. 10 illustrates the mirror assembly 1004 rotating the mirror element 1008 to a first position to reflect light from an LED 1020 to the projection components 1016 in time with the activation of the LED 1020.

Figure 11:
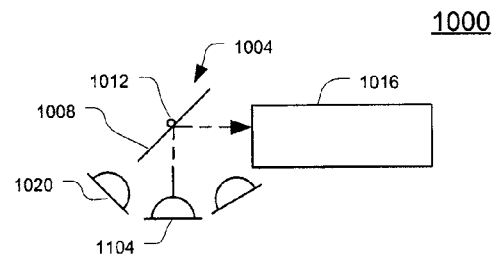
FIG. 11 illustrates the illumination arrangement depicted in FIG. 10 with the mirror assembly optically coupling a second light source to the projection components, in accordance with another embodiment of the present invention.

FIG. 11 illustrates the illumination arrangement 1000 having the mirror assembly 1004 optically coupling a second LED 1104 to the projection components 1016. The mirror assembly 1004 may rotate the mirror element 1008 such that light provided by the activation of the LED 1104 may be reflected into the projection components 1016.

Figure 12:
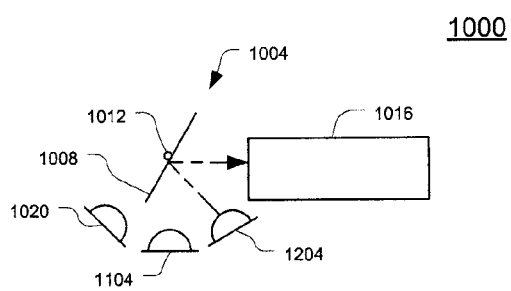
FIG. 12 illustrates the illumination arrangement depicted in FIG. 11 with the mirror assembly optically coupling a third light source to the projection components, in accordance with another embodiment of the present invention.

FIG. 12 illustrates the illumination arrangement 1000 having the mirror assembly 1004 optically coupling a third LED 1204 to the projection components 1016. The mirror assembly 1004 may rotate the mirror element 1008 such that light provided by the activation of the LED 1204 may be reflected into the projection components 1016. The mirror assembly 1004 may then rotate the mirror element 1008 back to the first position, depicted in FIG. 11, for activation of the first LED 1020.

In various embodiments, illumination arrangements may have a mirror assembly with any number of positions, to optically couple the light paths of any number of light sources for provision of the light to downstream projection components, e.g., a light tunnel.

Figure 13:
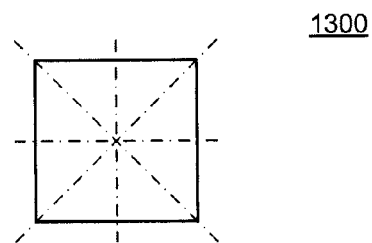
FIG. 13 illustrates axis of symmetry of a mirror element in accordance with various embodiments of the present invention.

In various embodiments, the mirror elements 808 and 1008 may be coupled to respective hinges 812 and 1012 located along any of a plurality of axes. For example, FIG. 13 illustrates a mirror element 1300 that may be similar to and substantially interchangeable with mirror element 808 and/or 1008. The mirror element 1300 is shown with diagonal 1304, horizontal 1308, and vertical 1312 axes of symmetry on which a hinge may be located. In various embodiments, positioning a hinge along an axis of symmetry, such as those shown in FIG. 13, may facilitate rotational performance. However, other embodiments may have a hinge located in along a non-symmetrical axis, e.g., an edge.

Figure 14:
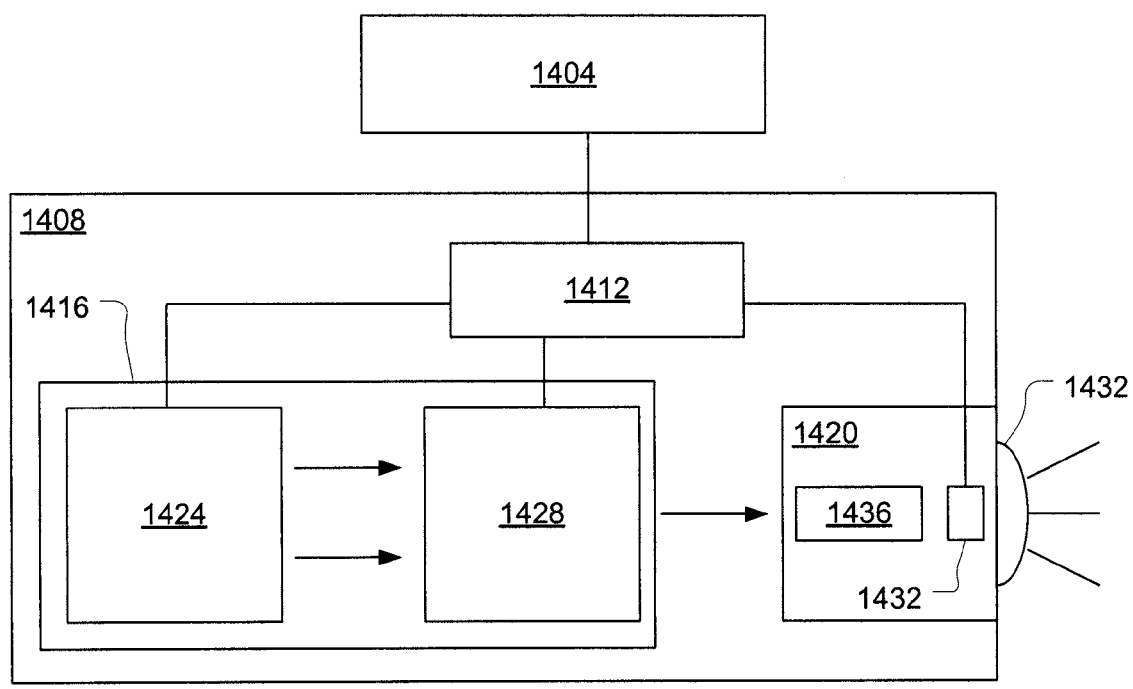
FIG. 14 illustrates a projection system in accordance with an embodiment of the present invention.

FIG. 14 illustrates a projection system in accordance with an embodiment of the present invention. In this embodiment, a data source 1404 may be coupled to a projection apparatus 1408 to provide signals corresponding to an image to be projected. The projection apparatus 1408 may include a controller 1412 to receive the image signal from the data source 1404 and generate control signals. The controller 1412 may be coupled to, and control operation of, an illumination arrangement 1416 and projection components 1420 in a manner to effectuate a rendering of a projected image corresponding to the image signals provided by the data source 1404. In particular the controller 1412 may control operation of light sources 1424 and mirror assembly 1428 of the illumination arrangement 1416 and a light valve 1432 of the projection components.

For the purpose of this description, a still image may be considered as a degenerate or special video where there is only one frame. Accordingly, both still image and video terminologies may be used in the description to follow, and they are not to be construed to limit the embodiments of the present invention to the rendering of one or the other.

In an embodiment a plurality of light sources 1424 may emit light along respective light paths in respective light emission periods. The mirror assembly 1428 may be controlled to operate in coordination with the respective light emission periods to receive light along the plurality of paths and to provide the light to the projection components 1420 along a common light path.

The projection components 1420 may receive the light along the common light path and modulate the light to provide a projected image corresponding to the video signals received from the data source 1404. In particular the projection components 1420 may have an integration device, e.g., a light tunnel 1436 (as shown), a flys-eye lens, etc., to receive the light along the common light path and to integrate the received light. The light valve 1432 may receive the integrated light and may render an image using a large number of individually addressable elements. In various embodiments the light valve 1432 may be a digital micromirror device (DMD), a liquid crystal device (LCD), etc. The rendered image may be projected for viewing via a projection lens 1440.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
    a plurality of light sources, including at least a first light emitting device (LED), a second LED, and a third LED, configured to emit light;
    a light valve configured to manipulate received light into a predetermined image; and
    a mirror assembly configured to operate to sequentially optically couple each of the plurality of light sources to the light valve, the mirror assembly comprising:
        a mirror wheel having an axle, a transparent portion, and a non-transparent portion, the mirror wheel configured to rotate the transparent portion and the non-transparent portion around the axle to sequentially optically couple each of the plurality of light sources to the light valve, wherein the mirror wheel has a first surface and a second surface and the non-transparent portion has a mirror element on the first surface of the mirror wheel;
    wherein the mirror assembly further comprises another mirror element configured:
        to receive light from the first LED reflected off of the mirror element of the mirror wheel;

to receive light from the second LED transmitted through the transparent portion; and to reflect received light towards the light valve; and wherein the third LED is arranged relative to the mirror wheel such that light from the third LED is incident upon the second surface of the mirror wheel.

2. The apparatus of claim 1, wherein the mirror wheel is arranged relative to the first and second LED such that light from the first LED is incident upon the first surface of the mirror wheel and the light from the second LED is incident upon the second surface of the mirror wheel.

3. The apparatus of claim 1, wherein the mirror wheel is configured to optically couple the first LED to the light valve by positioning the mirror element in a manner to reflect the light from the first LED towards the light valve and the mirror wheel is configured to optically couple the second LED to the light valve by positioning the transparent portion in a manner to transmit light from the second LED towards the light valve.

4. An apparatus comprising:
a plurality of light sources, including at least a first light emitting device (LED), a second LED, and a third LED, configured to emit light;
a light valve configured to manipulate received light into a predetermined image; and
a mirror assembly configured to operate to sequentially optically couple each of the plurality of light sources to the light valve, the mirror assembly comprising:
a mirror wheel having an axle, a transparent portion, and a non-transparent portion, the mirror wheel configured to rotate the transparent portion and the non-transparent portion around the axle to sequentially optically couple each of the plurality of light sources to the light valve, wherein the mirror wheel has a first surface and a second surface and the non-transparent portion has a mirror element on the first surface of the mirror wheel;
wherein the mirror assembly further comprises another mirror element configured:
to receive light from the first LED reflected off of the mirror element of the mirror wheel;
to receive light from the second LED transmitted through the transparent portion; and
to reflect received light towards the light valve; and
wherein the mirror wheel is further configured to propagate the light reflected from the another mirror element towards the light valve.

5. A method comprising:
providing light with a plurality of light sources, including at least a first light emitting device (LED), a second LED, and a third LED;
operating a mirror assembly to sequentially couple the light from each of the plurality of light sources to a light valve, the mirror assembly comprising a mirror wheel having an axle, a transparent portion, and a non-transparent portion, wherein the mirror wheel has a first surface and a second surface and the non-transparent portion has a first mirror element on the first surface of the mirror wheel, wherein the mirror assembly further comprises a second mirror element, and
manipulating the light, with the light valve, into a predetermined image;
wherein said operating the mirror assembly further comprises:
rotating the transparent portion and the non-transparent portion around the axle to sequentially optically couple each of the plurality of light sources to the light valve;

receiving, at the second mirror element, light from the first LED reflected off of the first mirror element of the mirror wheel;
receiving, at the second mirror element, light from the second LED transmitted through the transparent portion;
reflecting, by the second mirror element, light received from the first LED and second LED towards the light valve; and
propagating, by the mirror wheel, light reflected from the second mirror element towards the light valve.

6. The method of claim 5, wherein said providing of light with the plurality of light sources further comprises:
providing light with each of the plurality of light sources in respective, substantially non-overlapping light-emission periods.

7. The method of claim 6, further comprising:
coordinating operating of the mirror assembly with the light-emission periods.

8. A system comprising:
a controller configured to receive video signals from a video source and to generate control signals based at least in part on received video signals;
a light valve coupled to the controller and configured to manipulate received light into an image based at least in part on the control signals;
a plurality of light sources, including at least a first light emitting device (LED), a second LED, and a third LED, configured to emit light; and
a mirror assembly configured to operate to sequentially optically couple each of the plurality of light sources to the light valve, the mirror assembly comprising:
a mirror wheel having an axle, a transparent portion, and a non-transparent portion, the mirror wheel configured to rotate the transparent portion and the non-transparent portion around the axle to sequentially optically couple each of the plurality of light sources to the light valve, wherein the mirror wheel has a first surface and a second surface and the non-transparent portion has a mirror element on the first surface of the mirror wheel;
wherein the mirror assembly further comprises another mirror element configured:
to receive light from the first LED reflected off of the mirror element of the mirror wheel;
to receive light from the second LED transmitted through the transparent portion; and
to reflect received light towards the light valve; and
wherein the third LED is arranged relative to the mirror wheel such that light from the third LED is incident upon the second surface of the mirror wheel.

9. The system of claim 8, wherein the mirror wheel is arranged relative to the first and second LED such that light from the first LED is incident upon the first surface of the mirror wheel and the light from the second LED is incident upon the second surface of the mirror wheel.

10. The system of claim 8, wherein the mirror wheel is configured to optically couple the first LED to the light valve by positioning the mirror element in a manner to reflect the light from the first LED towards the light valve and the mirror wheel is configured to optically couple the second LED to the light valve by positioning the transparent portion in a manner to transmit light from the second LED towards the light valve.

11. A system comprising:
a controller configured to receive video signals from a video source and to generate control signals based at least in part on received video signals;

a light valve coupled to the controller and configured to manipulate received light into an image based at least in part on the control signals;

a plurality of light sources, including at least a first light emitting device (LED), a second LED, and a third LED, configured to emit light; and a mirror assembly configured to operate to sequentially optically couple each of the plurality of light sources to the light valve, the mirror assembly comprising:

a mirror wheel having an axle, a transparent portion, and a non-transparent portion, the mirror wheel configured to rotate the transparent portion and the non-transparent portion around the axle to sequentially optically couple each of the plurality of light sources to the light valve, wherein the mirror wheel has a first surface and a second surface and the non-transparent portion has a mirror element on the first surface of the mirror wheel;

wherein the mirror assembly further comprises another mirror element configured:
to receive light from the first LED reflected off of the mirror element of the mirror wheel;
to receive light from the second LED transmitted through the transparent portion; and
to reflect received light towards the light valve; and wherein the mirror wheel is further configured to propagate the light reflected from the another mirror element towards the light valve.

12. The system of claim 8, wherein the controller is further coupled to the mirror assembly and the plurality of light sources and configured to activate the plurality of light sources to emit light in coordination with operation of the mirror assembly.

13. The apparatus of claim 4, wherein the mirror wheel is arranged relative to the first and second LED such that light from the first LED is incident upon the first surface of the mirror wheel and the light from the second LED is incident upon the second surface of the mirror wheel.

14. The apparatus of claim 4, wherein the mirror wheel is configured to optically couple the first LED to the light valve by positioning the mirror element in a manner to reflect the light from the first LED towards the light valve and the mirror wheel is configured to optically couple the second LED to the light valve by positioning the transparent portion in a manner to transmit light from the second LED towards the light valve.

15. The system of claim 11, wherein the mirror wheel is arranged relative to the first and second LED such that light from the first LED is incident upon the first surface of the mirror wheel and the light from the second LED is incident upon the second surface of the mirror wheel.

16. The system of claim 11, wherein the mirror wheel is configured to optically couple the first LED to the light valve by positioning the mirror element in a manner to reflect the light from the first LED towards the light valve and the mirror wheel is configured to optically couple the second LED to the light valve by positioning the transparent portion in a manner to transmit light from the second LED towards the light valve.

17. The system of claim 11, wherein the controller is further coupled to the mirror assembly and the plurality of light sources and configured to activate the plurality of light sources to emit light in coordination with operation of the mirror assembly.

* * * * *